Sept. 6, 1955     D. L. HILEMAN     2,717,345
BIDIRECTIONAL REMOTE ELECTRICAL CONTROL DEVICE
Filed April 8, 1953     2 Sheets-Sheet 1
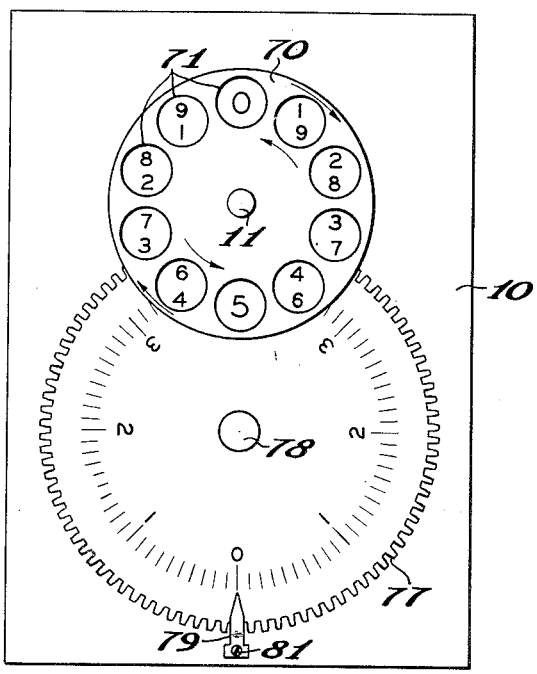
INVENTOR.
DALE L. HILEMAN
BY
ATTORNEY

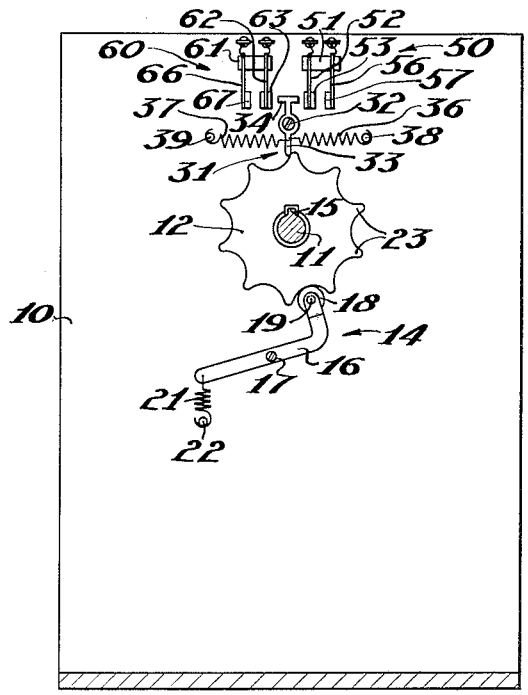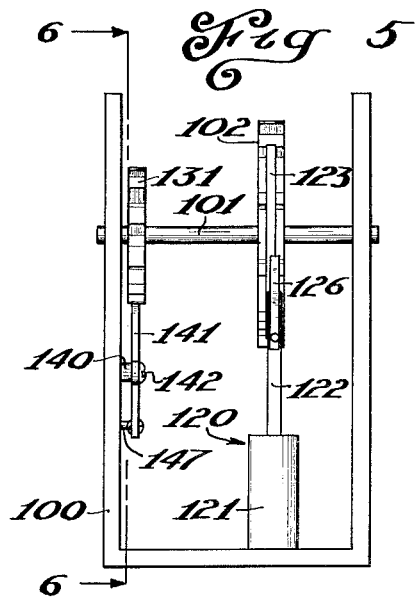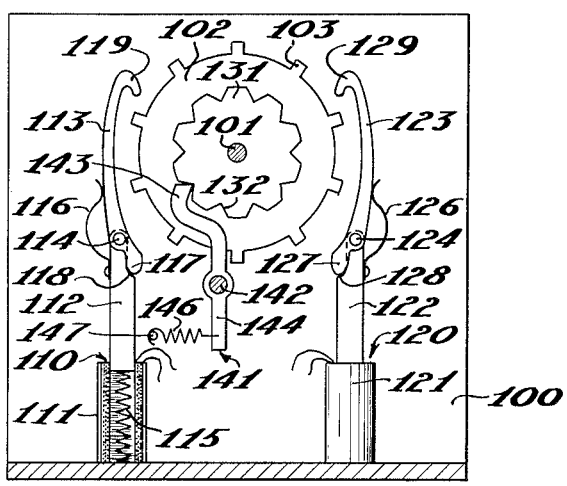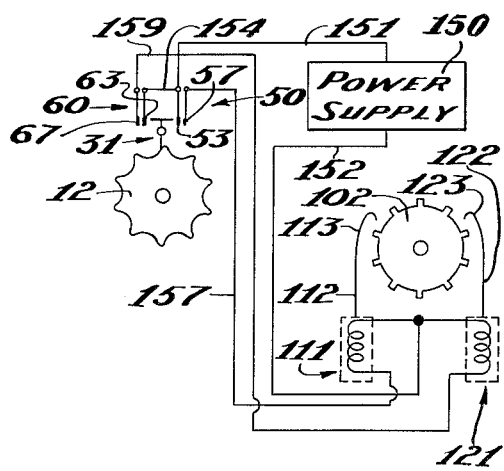

United States Patent Office 2,717,345
Patented Sept. 6, 1955

2,717,345

BIDIRECTIONAL REMOTE ELECTRICAL CONTROL DEVICE

Dale L. Hileman, Cedar Rapids, Iowa, assignor to Collins Radio Company, Cedar Rapids, Iowa, a corporation of Iowa Application April 8, 1953, Serial No. 347,519

9 Claims. (Cl. 318—129)

This invention relates in general to bidirectional remote control devices and, in particular, to an electromechanical relay mechanism which will provide positive bidirectional control over a remotely located shaft.

Sometimes devices requiring exact rotational control are located in remote inaccessible places. In electronic equipment such a device might be a slug tuned inductance or a capacitor which must be remotely located from a control panel. It is usually desirable and often necessary to control such equipment bidirectionally. (The term "bidirectional control," as used in this specification, means control in either the clockwise or counterclockwise directions.) For example, a lead screw mounted tuning slug for a coil should generally be controlled so that it can be adjusted in two directions. It is therefore the principal object of this invention to provide a mechanism which will control the position of a remotely located shaft in either direction.

This invention provides a control station which generates a special sequence of pulses or gates for each rotational direction. The pulses are transmitted over a 3 wire system (which could be made a two wire system by substituting ground for one wire) to a remote unit that rotates a shaft in a direction that corresponds to the pulse sequence received. The amount of rotation depends on the number of pulses received in a sequence. An operator at the control station can therefore rotate a remote shaft in either direction as desired.

Other objects, features and advantages will become apparent from the following description and drawings, in which:

Figure 1 is a front elevational view of the control station;

Figure 2 is a side elevational view of the control station;

Figure 3 is a sectional view taken on section 3—3 indicated in Figure 2;

Figure 4 shows section 4—4 as indicated in Figure 2;

Figure 5 is a side elevational view of the remote unit;

Figure 6 shows section 6—6 indicated in Figure 5; and

Figure 7 is a schematic diagram of the electrical connections between the control station and remote unit.

This invention provides an electromechanical pulse generating means which consists of a star-wheel and two sets of contacts. One set of contacts is activated only by rotation of the star-wheel in the clockwise direction, and the other set of contacts is activated only by counterclockwise rotation. Each set of contacts has an individual transmission circuit which connects it to its individual relay in a remote controlled unit.

The remote controlled unit consists of a pin-wheel and a pair of solenoid operated ratchet relays. Each relay is in a circuit connected to one set of control station contacts and rotates the pin-wheel in one direction by the amount of one pin for each pulse received. Rotation of one pin per pulse corresponds to a specific number of degrees per pulse for the controlled shaft.

The control station is illustrated in Figures 1, 2, 3 and 4. Figure 2 shows a U-shaped frame 10 that rotatably supports a keyed shaft 11 which carries a star-wheel 12 that is best shown in Figure 4. Star-wheel 12 has a loose fitting key slot 15 that provides a suitable amount of lost motion between shaft 11 and star-wheel 12.

A detent 14 rides on the periphery of star-wheel 12 and comprises a pawl 16 pivotally supported on a stud 17 which extends from a frame projection 13 (See Figure 2). A wheel 18 is rotatably supported by one end of pawl 16 and engages the star-wheel. A spring 21 is attached to a peg 22 that biases detent 14 toward the star-wheel and causes wheel 18 to rest midawy between a pair of star-wheel teeth 23.

When star-wheel 12 is rotated, teeth 23 will strike the foot portion 33 of a switching pawl 31 which is pivotally supported by a stud 32 that extends from a projection 30 fixed to frame 10. Pawl 31 is normally biased to a neutral position by springs 36 and 37 which are attached to pegs 38 and 39, respectively, mounted on the frame.

A head portion 34 of pawl 31 is moved to the right in Figure 4 by counterclockwise rotation of star-wheel 12 and will activate a contact assembly 50. Assembly 50 consists of a plastic insulator support 51 mounted on frame 10 that has molded therein the ends of a pair of parallel spring supports 52 and 56 which are tipped with the contacts 53 and 57, respectively.

When head portion 34 is moved to the left in Figure 4 by clockwise movement of star-wheel 12, it will activate contact assembly 60 which consists of a plastic insulator support 61 mounted on frame 10. Support 61 has molded therein parallel spring supports 62 and 66 that are tipped with contacts 63 and 67, respectively.

Referring to Figures 1 and 2, a dial finger plate 70 which contains as many equally spaced finger holes 71 as there are teeth in the star-wheel, is fixed to the end of shaft 11. A dial indicator 72 with a central opening 73 is located behind plate 70 and is attached to frame 10 by a bracket 74. The portion of the face of indicator 72 that is visible through holes 71 is numbered as shown in Figure 1, with the upper numbers increasing in a counterclockwise manner and the lower numbers increasing in a clockwise manner. Although plate 70 moves relative to indicator 72, the holes 71 will always line up with the numerals on indicator 72 because of detent 14. The arrows on the face of plate 70 indicate which set of numbers on indicator 72 correspond to a particular rotational direction.

A pinion 76 is mounted rigidly to shaft 11 behind indicator 72 and meshes with an indicator gear 77 rotatably supported by a shaft 78 fixed to frame 10. The face of gear 77 is engraved to indicate the rotational position of the remote controlled shaft with the aid of a pointer 79 which is fastened to frame 10 by a screw 81.

The remote controlled unit which is shown in Figures 5 and 6 has a U-shaped frame 100 that rotatably supports a shaft 101 on which is fixed a pin-wheel 102 that has radial pin teeth 103.

Pin-wheel 102 can be rotated in a counterclockwise direction in Figure 6 by a relay assembly 110 which comprises a solenoid 111 attached to the base of frame 100. A plunger 112 is controlled by solenoid 111 and is biased outwardly by a spring 115. A ratchet pawl 113 is pivotally mounted on plunger 112 by a pin 114 and is biased by a spring 116 mounted on plunger 112 to an extreme clockwise position limited by a foot portion 117 which rests in plunger indentation 118. A tip portion 119 of pawl 113 is formed downwardly toward the pin-wheel so that it will engage pin teeth 103 when moved down but will slip over pin teeth 103 when moved up.

Another relay assembly 120 is located on the opposite side of pin-wheel 102 to rotate it in the clockwise direction. It consists of a solenoid 121 attached to frame 110. A plunger 122 is mounted in solenoid 121 and is outwardly biased by a spring within the solenoid. A ratchet pawl 123 is pivotally mounted on plunger 122 by a pin 124 and is biased by a spring 126 on plunger 122 to an extreme counterclockwise position limited by a foot portion 127 which rests in a plunger indentation 128.

A stop wheel 131 is also fixed on shaft 101 and has a series of equally spaced notches 132 around its periphery equal in number to pin teeth 103. A pawl 141, with a head portion 143 that engages notches 132, is pivotally mounted on a stud 142 which extends from a projection 140 attached to frame 100 and is spring biased clockwise in Figure 6 by a spring 146 attached to a peg 147 on frame 100.

The control unit is wired to the remote unit as shown in Figure 7. Lead 154 connects contacts 53 and 63. Another lead 157 connects contact 57 to solenoid 111 and lead 159 connects contact 67 to solenoid 121. Lead 151 connects contacts 53 and 63 to one side of a power supply 150. Conductor 152 connects the other side of power supply 150 to solenoids 111 and 121.

If an operator situated at the control station desires to rotate the remote shaft 101 a definite number of increments of rotation in a certain direction, he may turn dial finger plate 70 at the control station in that direction the desired number of increments.

For purposes of illustration suppose the operator turns dial 70 four increments in the counterclockwise direction. Shaft 11 will rotate and cause four of the star-wheel teeth 23 to move switching pawl 31. Head portion 34 will cause contacts 53 and 57 to electrically make and break four times without closing contacts 63 and 67. Four pulses or gates will be sent to solenoid 111 which is in series with contacts 53 and 57. Each pulse will energize and de-energize solenoid 111. This will cause plunger 112 to move down and up, respectively, to move pin-wheel 102 one notch counterclockwise on each pulse. Therefore, the four pulses will move wheel 102 four notches counterclockwise and rotate shaft 101 four increments of 36 degrees for a total movement of 144 degrees counterclockwise. This assumes that the notches are equally spaced.

Now suppose the operator wishes to move the shaft 101 fifteen increments in the clockwise direction. He merely turns the dial plate 70 fifteen units in the clockwise direction which will require one and one-half revolutions of plate 70. Pawl 31 will be pivoted to the left fifteen times as star-wheel teeth 23 strike pawl 31 that many times to close and open contacts 63 and 67. Fifteen pulses will be generated that will energize and de-energize solenoid 121 fifteen times to ratchet the pin-wheel 102 fifteen pins in the clockwise direction. Shaft 101 will then be moved fifteen 36 degree increments or 540 degrees clockwise. The resultant position of shaft 101 will be shown by indicator 79 on gear indicator 77. It is to be understood that any other type of rotation counter may be used.

The pawl 141 provides positive positioning of the controlled shaft.

It is to be realized that the number of pins on pin-wheel 102 need have no relation to the number of teeth on star-wheel 12. For example, pin-wheel 102 could have 211 pins while star-wheel 12 has 13 teeth. Their only relationship is that pin-wheel 102 is rotated one pin every time a star-wheel tooth 23 passes switching pawl 31.

The key slot 15 provides a sufficient amount of lost motion between shaft 11 and star-wheel 12 to allow detent 14 to rotate star-wheel 12 to its next stable position after detent 14 rides past the peak of a tooth 23. The lost motion feature will then prevent the operator from holding the contacts closed and causes the contacts to break quickly to prevent undue contact burning.

Merely for illustration the embodiment chosen has 36 degree increments of rotation per pulse for shaft 101. However, the increment can be made any amount as determined by the formula $$\frac{360}{n}$$

where $n$ is an integer greater than 4. However, by suitable gearing to the controlled shaft, the geared shaft can operate with $n$ as a fraction or mixed number as well as an integer. It is therefore possible to gear down the shaft 101 by anti-backlash gears to obtain smaller increments on the geared shaft.

Other modifications may be made in the disclosed embodiment, as will be clear to those skilled in the art, without departing from the spirit and scope of the invention.

I claim:

1. Means for actuating a controlled shaft at a controlled unit comprising, a control unit frame member, a first shaft rotatably supported by said control unit frame member, a dial plate mounted on said first shaft, a star-wheel mounted on said first shaft, a switching pawl rotatably supported by said control unit frame member and engageable by said star-wheel, first and second switches mounted on opposite sides of said switching pawl and engaged, respectively, upon opposite rotation of said star-wheel, a pair of relays at the controlled unit, a controlled unit frame member rotatably supporting the controlled shaft, a pair of ratchet pawls connected to said pair of relays, a pin-wheel mounted on said controlled shaft, said ratchet pawls engageable with said pin-wheel when their respective relays are energized, a power supply connected to the first and second switches and the first and second relays, and the first and second switches connected, respectively, to the first and second relays.

2. Means for controlling a controlled shaft from a remote position comprising, a control station frame member, a first shaft rotatably supported by said control station frame member, a star-wheel carried on said first shaft, a switching pawl rotatably supported by said control station frame member and engageable by said star-wheel, first and second switches mounted on said control station frame member on opposite sides of said switching pawl and engaged respectively upon rotation in the opposite direction of the star-wheel, a dial finger plate mounted on said first shaft to rotate it, a controlled station frame member, the controlled shaft rotatably supported by said controlled station frame member, a pair of relays supported by said controlled station frame member on opposite sides of the controlled shaft, a pair of ratchet pawls controlled by the first and second relays, a pin-wheel mounted on said controlled shaft, said first and second ratchet pawls engageable respectively with the pin-wheel upon actuation of the first and second relays respectively, a power supply connected to the first and second switches and the first and second relays, the first relay connected to the first switch and the second relay connected to the second switch.

3. Means for controlling a controlled shaft from a remote position comprising, a control station first frame member, a first shaft rotatably supported by said first frame member, a star-wheel mounted on said first shaft, a switching pawl rotatably supported by said first frame member and engageable by said star-wheel, first and second switches mounted on opposite sides of said switching pawl and engaged, respectively, upon rotation in the opposite direction of the star-wheel, a dial finger plate mounted on said first shaft to rotate it, a controlled station second frame member, the controlled shaft rotatably supported by said second frame member, a pair of relays supported by said second frame member on opposite sides of the controlled shaft, a pair of ratchet pawls controlled by the first and second relays, a pin-wheel mounted on said controlled shaft, said first and second ratchet pawls engageable respectively with the pin-wheel upon actuation of the first and second relays respectively, a power supply connected to the first and second switches and the first and second relays, the first relay connected to the first switch and the second relay connected to the second switch, and a detent rotatably supported by the first frame member and engageable with said star-wheel.

4. Means for controlling a controlled shaft from a remote position comprising, a control station frame member, a first shaft rotatably supported by said control station frame member, a star-wheel carried on said first shaft, a switching pawl rotatably supported by said control station frame member and engageable by said star-wheel, first and second switches mounted on opposite sides of said switching pawl and engaged, respectively, upon rotation in opposite directions by the star-wheel, a dial finger plate mounted on said first shaft to rotate it, a controlled station frame member, the controlled shaft rotatably supported by said controlled station frame member, a pair of relays supported by said controlled station frame member on opposite sides of the controlled shaft, a pair of ratchet pawls connected to the first and second relays, a pin-wheel mounted on said controlled shaft, said first and second ratchet pawls engageable respectively with the pin-wheel upon actuation of the first and second relays respectively, a power supply connected to the first and second switches and the first and second relays, the first relay connected to the first switch and the second relay connected to the second switch, a stop pawl pivotally supported on the controlled station frame member, and a notched ring mounted on said controlled shaft and engageable with said stop pawl.

5. Means for controlling a controlled shaft from a remote position comprising, a control station frame member, a first shaft rotatably supported by said control station frame member, a star-wheel carried on said first shaft, an indicator gear driven by said first shaft to indicate the relative position of the controlled shaft, a switching pawl rotatably supported by said control station frame member and engageable by said star-wheel, first and second switches mounted on opposite sides of said switching pawl and engaged, respectively, upon rotation in the opposite direction of the star-wheel, a dial finger plate mounted on said first shaft to rotate it, a controlled station frame member, the controlled shaft rotatably supported by said controlled station frame member, a pair of relays supported by said controlled station frame member on opposite sides of the controlled shaft, a pair of ratchet pawls connected to the first and second relays, a pin-wheel mounted on said controlled shaft, said first and second ratchet pawls engageable respectively with the pin-wheel upon actuation of the first and second relays respectively, a power supply connected to the first and second switches and the first and second relays, the first relay connected to the first switch and the second relay connected to the second switch.

6. Means for controlling a controlled shaft from a remote position comprising, a control station frame member, a first shaft rotatably supported by said control station frame member, a star-wheel loosely keyed on said first shaft, a switching pawl rotatably supported by said control station frame member and engageable by said star-wheel, a pair of springs connected to the switching pawl and to the control station frame member to spring bias the switching pawl to a central neutral position, first and second switches mounted on the control station frame member on opposite sides of said switching pawl and engaged, respectively, upon rotation in opposite directions of the star-wheel, a dial finger plate mounted on said first shaft to rotate it, a controlled station frame member, the controlled shaft rotatably supported by said controlled station frame member, a pair of relays supported by said controlled station frame member on opposite sides of the controlled shaft, a pair of ratchet pawls connected respectively to the first and second relays, a pin-wheel mounted on said controlled shaft, said first and second ratchet pawls engageable respectively with the pin-wheel upon actuation of the first and second relays respectively, a power supply connected to the first and second switches and the first and second relays, the first relay connected to the first switch and the second relay connected to the second switch.

7. Means for controlling a controlled shaft from a remote position comprising a control station frame member, a first shaft rotatably supported by said control station frame member, a star-wheel carried on said first shaft, said star-wheel loosely keyed to said first shaft to allow lost motion therebetween, a switching pawl rotatably supported by said control station frame member and engageable by said star-wheel, first and second switches mounted on opposite sides of said switching pawl and engaged, respectively, by the teeth of said star-wheel upon rotation in opposite directions of the star-wheel, a dial finger plate mounted on said first shaft to rotate it, a controlled station frame member, the controlled shaft rotatably supported by said controlled frame member, a pair of relays supported by said controlled station frame member on opposite sides of the controlled shaft, a pair of ratchet pawls respectively connected to the first and second relays, a pin-wheel mounted on said controlled shaft, said first and second ratchet pawls unidirectionally engageable respectively with the pin-wheel upon actuation of the first and second relays respectively, a power supply connected to the first and second switches and the first and second relays, the first relay connected to the first switch and the second relay connected to the second switch.

8. Means for controlling a controlled shaft from a remote position comprising, a control station frame member, a first shaft rotatably supported by said frame member, a star-wheel keyed loosely to said first shaft, a switching pawl rotatably supported by said control station frame member and engageable by said star-wheel, first and second switches mounted on said control station frame member on opposite sides of said switching pawl and engaged respectively upon rotation in the opposite direction of the star-wheel, means connected to said first shaft to rotate it, a controlled station second frame member, the controlled shaft rotatably supported by said second frame member, a pair of relays supported by said second frame member on opposite sides of the controlled shaft, a pair of ratchet pawls controlled by the first and second relays, a pin-wheel mounted on said controlled shaft, said first and second ratchet pawls unidirectionally engageable respectively with the pin-wheel upon actuation of the first and second relays respectively, a power supply connected to the first and second switches and the first and second relays, the first relay connected to the first switch and the second relay connected to the second switch, and first and second springs connected to said ratchet pawls to bias them outwardly from said first and second relays.

9. Means for controlling the position of a second shaft comprising, first frame means, a star-wheel rotatably supported by said first frame means, a switching pawl pivotally supported by said first frame means and reciprocally actuated by the teeth of said star-wheel when said wheel is rotated, switch means supported by said first frame means adjacent said switching pawl and engaged by said switching pawl, second frame means rotatably supporting said second shaft, ratchet wheel means supported by said second shaft, electrical relay means for reciprocating once when energized, said relay means supported by said second frame means, ratchet pawl means connected to said reciprocating relay means and engaging said ratchet wheel means to rotate it one notch for each energization of said relay, a power source, said relay means connected serially to said power source and said switch means.

References Cited in the file of this patent
UNITED STATES PATENTS

| | | |
|---|---|---|
| 327,657 | Clarke | Oct. 6, 1895 |
| 1,865,389 | Reddy | June 28, 1932 |
| 2,085,442 | Newell | June 29, 1937 |
| 2,433,376 | LeGrand | Dec. 30, 1947 |